(12) United States Patent
Chen

(10) Patent No.: US 9,979,464 B1
(45) Date of Patent: *May 22, 2018

(54) COMBINING TRANSPONDER BANDWIDTHS FOR SOURCE AND FORWARD ERROR CORRECTION ENCODING EFFICIENCY

(75) Inventor: Ernest C. Chen, San Pedro, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/484,756

(22) Filed: May 31, 2012

Related U.S. Application Data

(63) Continuation of application No. 11/193,856, filed on Jul. 29, 2005, now Pat. No. 8,200,149.

(51) Int. Cl.
*H04H 20/74* (2008.01)
*H04B 7/185* (2006.01)
(Continued)

(52) U.S. Cl.
CPC ............. *H04B 7/1851* (2013.01); *H04B 1/69* (2013.01); *H04B 7/18513* (2013.01);
(Continued)

(58) Field of Classification Search
CPC ........ H04B 1/69; H04B 1/707; H04B 7/0613; H04B 7/12; H04B 7/2041; H04B 7/20;
(Continued)

(56) References Cited

U.S. PATENT DOCUMENTS 3,812,430 A * 5/1974 Schmidt ............... H04B 7/2125
370/321
4,228,401 A * 10/1980 Wachs ................. H04B 7/2041
342/352

(Continued)

FOREIGN PATENT DOCUMENTS

EP       0033149 A2    8/1981
WO    2008/113033      9/2008
(Continued)

OTHER PUBLICATIONS

Non-final Office action dated Sep. 18, 2013 in U.S. Appl. No. 13/600,883, filed Aug. 31, 2012 by Paul R. Anderson et al.
(Continued)

*Primary Examiner* — Yuwen Pan
*Assistant Examiner* — Paul P Tran
(74) *Attorney, Agent, or Firm* — Gates & Cooper LLP

(57) ABSTRACT

An apparatus and method for combining transponder bandwidths comprises a wide-band virtual transponder for transmitting a single data stream. The wide-band virtual transponder is comprised of a plurality of narrow-band physical transponders. A plurality of elementary streams are statistically multiplexed to create the single data stream, wherein the single data stream is forward error correction encoded and demultiplexed into a plurality of transponder streams for transmission by the plurality of physical transponders. The physical transponders each use a different portion of a signal spectrum, wherein the different portion may be guard bands or a combination of legacy bands and guard bands. Upon receipt, the transponder streams are multiplexed to recover the single data stream, wherein the recovered single data stream is forward error correction decoded and statistically demultiplexed to recover the plurality of elementary streams.

25 Claims, 5 Drawing Sheets

(51) Int. Cl.

| | | |
|---|---|---|
| *H04B 7/19* | (2006.01) | |
| *H04W 4/00* | (2018.01) | |
| *G01S 13/00* | (2006.01) | |
| *G01S 13/08* | (2006.01) | |
| *H04B 7/216* | (2006.01) | |
| *H04H 20/67* | (2008.01) | |
| *H04J 3/16* | (2006.01) | |
| *H04J 3/22* | (2006.01) | |
| *H04B 1/00* | (2006.01) | |
| *H04B 14/04* | (2006.01) | |
| *H04K 1/10* | (2006.01) | |
| *H04L 27/28* | (2006.01) | |
| *H04N 7/20* | (2006.01) | |
| *H04N 7/173* | (2011.01) | |
| *H04B 1/69* | (2011.01) | |
| *H04J 13/00* | (2011.01) | |
| *H04L 5/00* | (2006.01) | |

(52) U.S. Cl.
CPC ..... *H04B 7/18515* (2013.01); *H04B 7/18543* (2013.01); *H04J 13/0048* (2013.01); *H04L 5/006* (2013.01); *H04L 5/0016* (2013.01)

(58) Field of Classification Search
CPC .. H04B 7/2618; H04B 1/719; H04B 7/18563; H04B 7/18543; H04B 7/216; H04J 3/1682; H04J 11/0023; H04J 13/00; H04J 13/0048; H04L 1/0002; H04L 5/0051; H04L 5/006; H04L 5/026; H04L 5/12; H04L 5/0016; H04N 7/17309; H04N 7/17318; H04N 7/20; H04N 21/6193; H04N 21/2383; H04N 21/437; H04N 21/47815; H04N 21/6143; H04N 21/23614; H04N 21/61; H04W 72/085
USPC ........... 342/30–35, 51, 57–58; 370/206, 209, 370/210, 280, 310, 316, 321, 323, 324, 370/325, 330, 335, 342, 345, 347, 436, 370/437, 477, 497; 375/130, 132, 146, 375/148, 219, 242, 259, 260, 261, 264, 375/295, 341, 377; 455/3.01, 11.1, 13.2, 455/63.3, 137, 266, 273, 339, 340, 429, 455/436, 443, 500, 501, 502, 552.1, 455/553.1, 561, 703; 725/63.95, 119, 725/120, 131, 146
See application file for complete search history.

(56) References Cited

U.S. PATENT DOCUMENTS

| | | | |
|---|---|---|---|
| 4,586,177 A | | 4/1986 | Kaul |
| 4,660,196 A | | 4/1987 | Gray et al. |
| 4,706,239 A | | 11/1987 | Ito et al. |
| 5,195,092 A | | 3/1993 | Wilson et al. |
| 5,216,503 A | | 6/1993 | Paik et al. |
| 5,319,707 A | | 6/1994 | Wasilewski et al. |
| 5,455,826 A | | 10/1995 | Ozveren et al. |
| 5,459,720 A | | 10/1995 | Iliev et al. |
| 5,537,435 A | * | 7/1996 | Carney et al. ................. 375/219 |
| 5,555,257 A | | 9/1996 | Dent |
| 5,648,958 A | | 7/1997 | Counterman |
| 5,691,986 A | | 11/1997 | Pearlstein |
| 5,818,887 A | * | 10/1998 | Sexton et al. ................. 375/355 |
| 5,835,857 A | | 11/1998 | Otten |
| 5,861,919 A | | 1/1999 | Perkins et al. |
| 5,878,037 A | | 3/1999 | Sherman |
| 5,956,088 A | | 9/1999 | Shen et al. |
| 5,974,316 A | | 10/1999 | Tayloe et al. |
| 6,091,455 A | | 7/2000 | Yang |
| 6,108,561 A | * | 8/2000 | Mallinckrodt ................. 455/522 |
| 6,181,711 B1 | | 1/2001 | Zhang et al. |
| 6,188,436 B1 | | 2/2001 | Williams et al. |
| 6,212,233 B1 | | 4/2001 | Alexandre et al. |
| 6,215,821 B1 | | 4/2001 | Chen |
| 6,240,072 B1 | | 5/2001 | Lo et al. |
| 6,256,290 B1 | | 7/2001 | Ramesh |
| 6,351,500 B2 | | 2/2002 | Kumar |
| 6,356,539 B1 | * | 3/2002 | Zuliani et al. ................. 370/320 |
| 6,377,561 B1 | | 4/2002 | Black et al. |
| 6,384,773 B1 | * | 5/2002 | Martin ..................... G01S 7/282 |
| | | | 342/159 |
| 6,539,050 B1 | * | 3/2003 | Lee et al. ....................... 375/146 |
| 6,697,364 B1 | * | 2/2004 | Kekki et al. .................. 370/389 |
| 6,771,671 B1 | * | 8/2004 | Fields ................... H04J 3/0685 |
| | | | 370/514 |
| 7,058,086 B2 | | 6/2006 | Marko |
| 7,613,233 B2 | * | 11/2009 | Hottinen ....................... 375/219 |
| 8,200,149 B1 | | 6/2012 | Chen |
| 2001/0001611 A1 | * | 5/2001 | Yuzawa ................. H04H 20/28 |
| | | | 370/475 |
| 2003/0054761 A1 | | 3/2003 | Karabinis |
| 2003/0217362 A1 | * | 11/2003 | Summers et al. .............. 725/63 |
| 2003/0224731 A1 | | 12/2003 | Yamaura et al. |
| 2003/0236068 A1 | | 12/2003 | Jespersen |
| 2004/0008617 A1 | * | 1/2004 | Dabak ................... H04J 13/004 |
| | | | 370/208 |
| 2005/0010960 A1 | | 1/2005 | Kitazawa et al. |
| 2006/0233280 A1 | * | 10/2006 | Tynderfeldt ............. H04B 7/04 |
| | | | 375/299 |
| 2008/0305736 A1 | | 12/2008 | Millbrandt et al. |
| 2009/0074051 A1 | | 3/2009 | Manapragada et al. |
| 2014/0070865 A1 | | 3/2014 | Fortier et al. |

FOREIGN PATENT DOCUMENTS

| | | |
|---|---|---|
| WO | 2008/113033 A1 | 9/2008 |
| WO | 20080113033 | 9/2008 |

OTHER PUBLICATIONS

Non-final Office action dated Nov. 12, 2015 in U.S. Appl. No. 13/829,916, filed Mar. 14, 2013 by Romulo Pontual et al.

Final Rejection dated Jan. 23, 2014 in U.S. Appl. No. 13/600,883, filed Aug. 31, 2012 by Paul R. Anderson et al.

Notice of Allowance dated Apr. 3, 2014 in U.S. Appl. No. 13/600,883, filed Aug. 31, 2012 by Paul R. Anderson et al.

Chalasani, Suresh; Varma, Anujan; "Efficient Time-Slot Assignment Algorithms for SS/TDMA Systems with Variable-Bandwidth Beams"; Networking in the Nineties; Bal Harbour, Florida; Apr. 7-11, 1991; [Proceedings of the Annual Joint Conference of the Computer and Communications Societies (INFOCOM)]; New York, New York; IEEE, US; vol. Conference 10; Apr. 7, 1991; pp. 658-667; XP010042453; DOI: 10.1109/INFCOM.1991.147568; ISBN: 978-0-87942-694-1; p. 648, paragraph 2—p. 659, paragraph 2, figure 2.

International Search Report and Written Opinion dated Jul. 28, 2014 in International Application No. PCT/US2014/084659 failed, Mar. 12, 2014 by Romulo Pontual et al.

Final Rejection dated Aug. 20, 2015 in U.S. Appl. No. 13/829,916, filed Mar. 14, 2013 by Romulo Pontual et al.

Non-final Office action dated Dec. 31, 2014 in U.S. Appl. No. 13/829,916, filed Mar. 14, 2013 by Romulo Pontual et al.

Final Rejection dated May 6, 2013 in U.S. Appl. No. 13/484,756, filed May 31, 2012 by Ernest C. Chen.

Sibley, M., "New Details on Comcast Upstream Channel Bonding"; Zatz Not Funny!, Jun. 16, 2011; retrieved from the Internet on May 18, 2012. http://www/zatznotfunny.com/2011-06.

Snyder, G. F ., Jr., "Comcast Deploying Upstream Channel Bonding"; Gordon's Information and Communications Technologies (ICT) Blog; Jun. 14, 2011; retrieved from the Internet on May 18, 2012. http://www.gordostuff.com/2011/06/comcast-deploying-upstream-channel.html.

Final Office Action dated May 2, 2017 in Colombian Patent Application No. 15-243-920 (translation-only).

(56) References Cited

OTHER PUBLICATIONS

Final Office Action dated May 2, 2017 in Colombian Patent Application No. 15-243-920 (translation-only attached.).

* cited by examiner

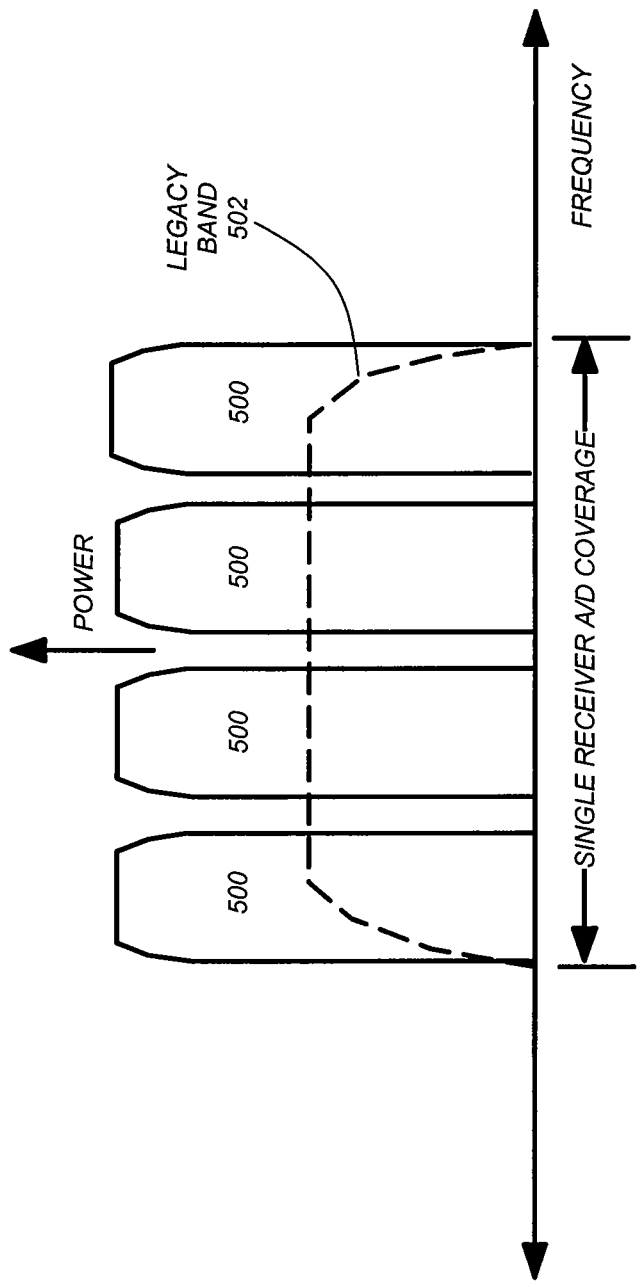

COMBINING TRANSPONDER BANDWIDTHS FOR SOURCE AND FORWARD ERROR CORRECTION ENCODING EFFICIENCY

BACKGROUND OF THE INVENTION

1. Field of the Invention

The present invention relates to systems and methods for the spectral efficient transmission of signals, and more particularly, for combining transponder bandwidths for source and forward error correction encoding efficiency.

2. Description of the Related Art

Digital Direct Broadcast Systems (DBS), such as DIRECTV®, which is provided by the assignee of the present invention, have become very successful. However, as such systems evolve, there is an increasing demand for additional bandwidth to carry an ever-increasing set of audio, video and data services.

Guard bands represent an attractive source of bandwidth that is still available. For example, in the current DIRECTV® frequency plan, a symbol rate of 20 MHz and an excess bandwidth ratio of 0.2 are used for a transponder, and a guard band of 5.16 MHz exists between adjacent transponders of the same polarization. This is a legacy configuration from earlier satellite communication standards for analog frequency modulation (FM) transmissions, wherein analog FM transmissions require a higher carrier-to-noise ratio (CNR) (on the order of 14 dB), and are therefore more susceptible to spectral re-growth effects from traveling wave tube amplifier (TWTA) non-linearity and other imperfections. Actually, the designed guard band has provided more than enough margin for analog FM transmissions to reject spread signal energy due to adjacent channel interference.

In comparison, the digital DBS signal requires a lower CNR, on the order of 7.6 dB with the prevailing quadrature phase shift keying (QPSK) modulation and concatenated forward error correction (FEC) codes with a code rate of 6/7. With the advent of turbo codes, which provide higher coding gains than conventional codes, the required CNR drops even lower, to around 5.4 dB for the same code rate. Again, other factors being equal, signals with smaller CNRs are less susceptible to noise and interference effects. Therefore, the existing guard band for the current DIRECTV® frequency plan may be reduced or even eliminated with only a small impact on communication performance. Eliminating the existing guard band would increase spectral efficiency by a factor of 21%. A throughput increase of this ratio would be achieved by increasing the symbol rate without the need to increase the code rate.

Consequently, there is a need in the art for methods and systems that allow for efficient use of a fragmented signal spectrum, such as from a plurality of non-contiguous guard bands. There is also a need in the art for methods and systems that reduce FEC code latency. The present invention satisfies these needs.

SUMMARY OF THE INVENTION

To address the requirements described above, the present invention discloses an apparatus and method for combining transponder bandwidths, comprising a wide-band virtual transponder for transmitting a single data stream using existing the frequency plan. The wide-band virtual transponder is comprised of a plurality of relatively narrow-band physical transponders. The narrow-band physical transponders each use a different portion of a signal spectrum, wherein the different portions may comprise non-contiguous portions of the signal spectrum, such as guard bands, or contiguous portions of the signal spectrum, such as a combination of legacy bands and guard bands in the signal spectrum.

A plurality of elementary streams are multiplexed to create the single data stream, wherein the single data stream is forward error correction encoded and demultiplexed into a plurality of transponder streams for transmission by the plurality of narrow-band physical transponders. Upon receipt, the transponder streams are multiplexed to recover the single data stream, wherein the recovered single data stream is forward error correction decoded and demultiplexed to recover the plurality of elementary streams.

BRIEF DESCRIPTION OF THE DRAWINGS

Referring now to the drawings in which like reference numbers represent corresponding parts throughout:

FIG. 5 illustrates the construction of high spectral-efficiency signals according to the preferred embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention combines transponder bandwidths using a wide-band "virtual" transponder comprised of a plurality of narrow-band physical transponders for transmitting a single data stream. A plurality of elementary streams are statistically multiplexed for compression to create the single data stream. The single data stream is forward error correction encoded for channel impairment correction. Thereafter, the single encoded data stream is demultiplexed into a plurality of transponder streams, and each transponder stream is modulated and transmitted to the plurality of narrow-band physical transponders. The narrow-band physical transponders, in turn, re-transmit the plurality of transponder streams. Upon receipt from the plurality of narrow-band physical transponders, the transponder streams are demodulated and multiplexed to recover the single data stream. The recovered single data stream is forward error correction decoded and demultiplexed to recover the plurality of elementary streams.

Using this technique, the present invention allows for the efficient use of a signal spectrum represented by the transmissions from each transponder. Specifically, the narrow-band physical transponders each use a different portion of a signal spectrum, wherein the different portions may comprise non-contiguous portions of the signal spectrum, such as guard bands, or the different portions may comprise a combination of legacy bands and guard bands in the signal spectrum. Without this technique, the limited throughput of a typical narrow bandwidth might not support the many channels that are required for efficient statistical multiplexing.

The present invention also reduces FEC code latency. The time duration of an FEC code for a lone signal provided by the guard band is quite long, due to the small symbol rate a narrow-band signal can support. By "pooling" the bandwidths of multiple narrow-band signals for the FEC code, the effective symbol rate is increased, resulting in a significant reduction in code length and therefore code latency. This can be important since more powerful and longer turbo codes are increasingly used in quasi-error free communication.

Direct Broadcast Satellite System

Figure 1:
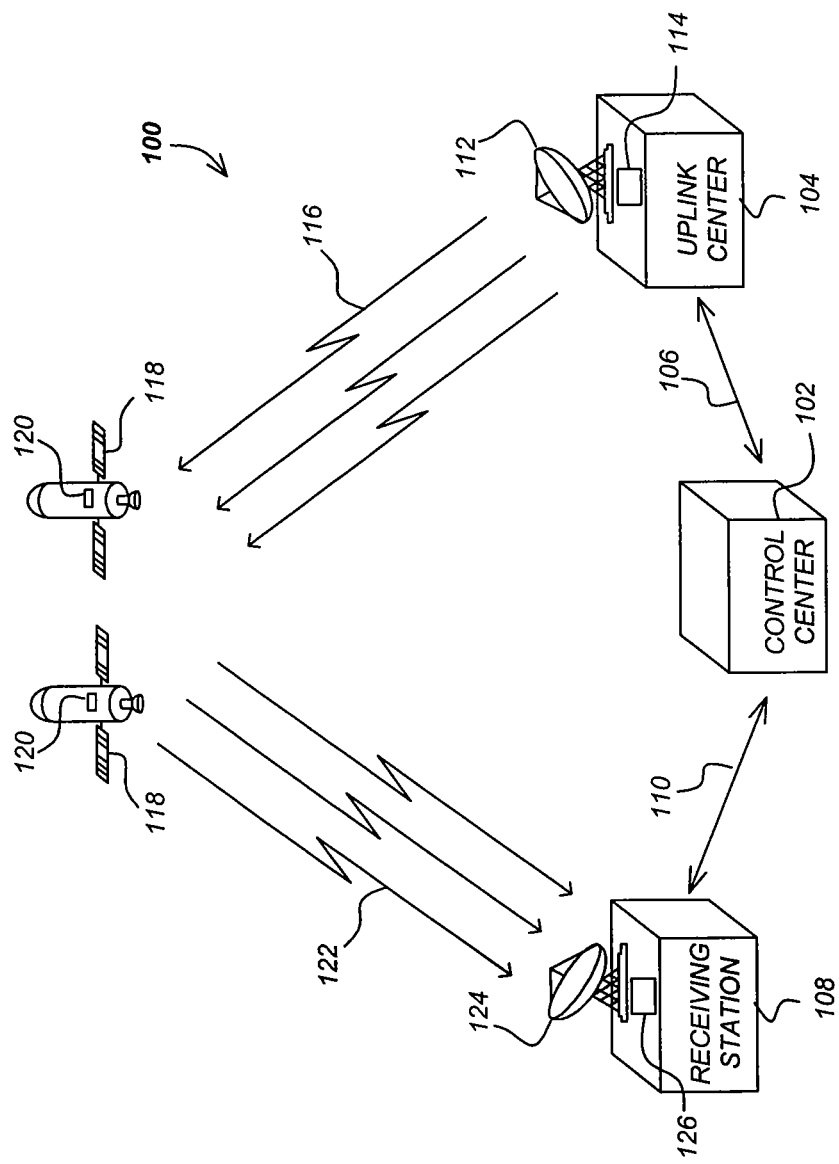
FIG. 1 is a diagram illustrating an exemplary direct broadcast satellite system according to a preferred embodiment of the present invention.

FIG. 1 is a diagram illustrating an exemplary direct broadcast satellite system 100 according to a preferred embodiment of the present invention. The system 100 includes a control center 102 operated by a service provider in communication with an uplink center 104 via a link 106 and with receiving stations 108 via a link 110. The control center 102 provides broadcast materials to the uplink center 104 and coordinates with the receiving stations 108 to offer various services, including key management for encryption and decryption, etc.

The uplink center 104 receives the broadcast materials from the control center 102 and, using an antenna 112 and transmitter 114, transmits the broadcast materials via uplink 116 to one or more satellites 118, each of which may include one or more transponders 120. The satellites 118 receive and process the broadcast materials, and re-transmit the broadcast materials to receiving stations 108 via a downlink 122 using transponders 120. Receiving stations 108 receive the broadcast materials from the satellites 118 via an antenna 124, and decrypt and decode the broadcast materials using a receiver 126.

Signal Transmission

Figure 2:
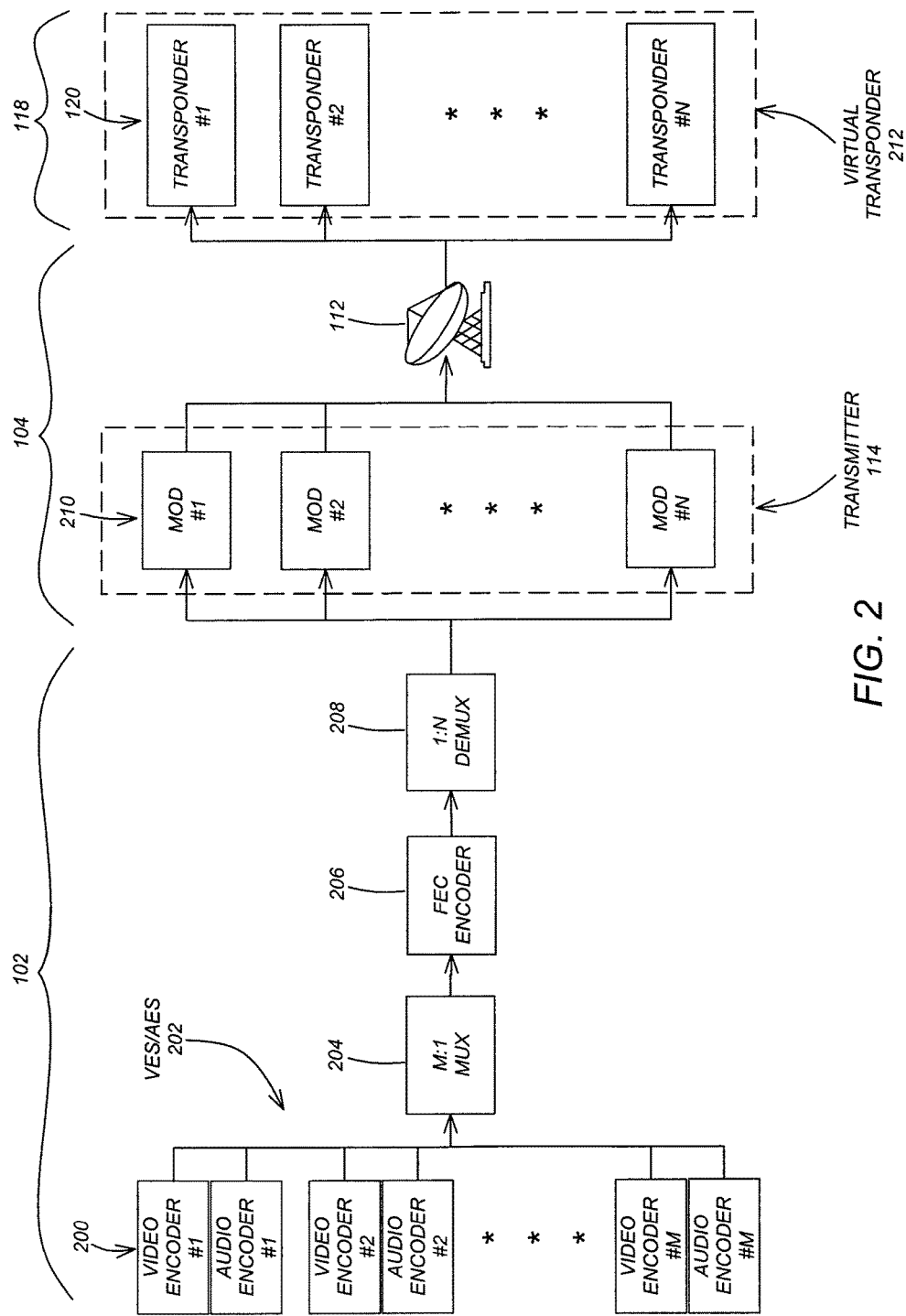
FIG. 2 is a block diagram that further illustrates an exemplary signal transmission system according to the preferred embodiment of the present invention.

FIG. 2 is a block diagram that further illustrates an exemplary signal transmission system according to the preferred embodiment of the present invention. The control center 102 includes a plurality M of video and/or audio encoders 200 that each encode a video and/or audio source into a video elementary stream (VES) and/or audio elementary stream (AES) 202. The resulting M video and/or audio elementary streams 202 are statistically multiplexed at 204, wherein the value M:1 indicates a multiplexing ratio that matches the throughput of the system. The resulting single data stream is then FEC encoded at 206. After encoding, the single encoded data stream is demultiplexed at 208 into N transponder data streams, wherein the value 1:N indicates a demultiplexing ratio that matches the number of transponders 120 being used. In the uplink center 104, each of the N transponder data streams is separately modulated 210 by the transmitter 114, and then uplinked via antenna 112 to the satellites 118. A plurality N of the transponders 120 on the satellites 118 (where N may comprise all of the transponders 120 or a subset of the transponders 120) are treated as a "virtual" transponder 212, wherein each of the N transponder data streams is routed to a different one of the N transponders 120 for re-transmission. Note that all N transponders do not have to be of the same bandwidth, and together they may carry a combination of legacy and guard-band signals as may be desired.

Signal Reception

Figure 3:
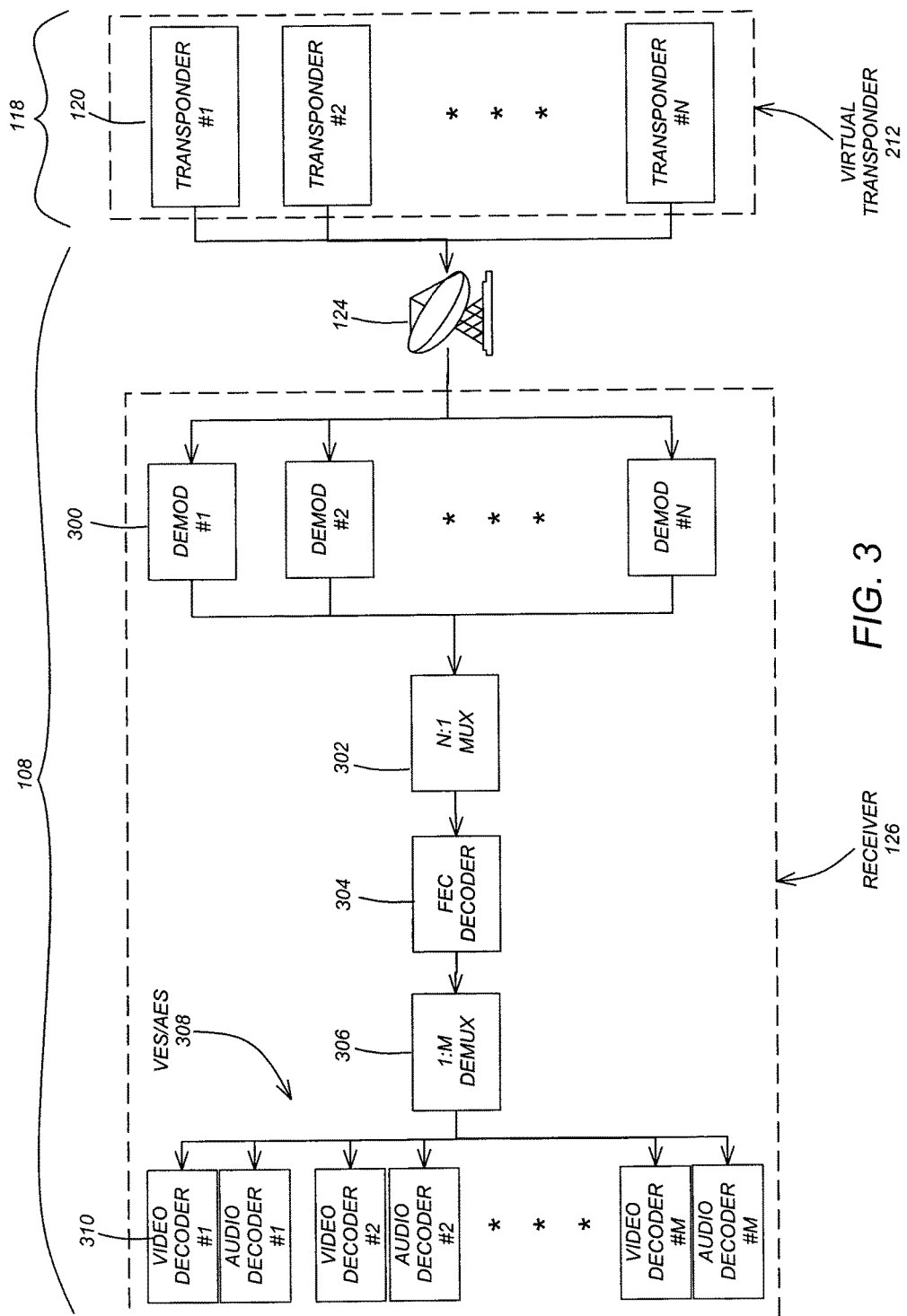
FIG. 3 is a block diagram that further illustrates an exemplary signal reception system according to the preferred embodiment of the present invention.

FIG. 3 is a block diagram that further illustrates an exemplary signal reception system according to the preferred embodiment of the present invention. As in FIG. 2, a plurality N of the transponders 120 on the satellites 118 (where N may comprise all of the transponders 120 or a subset of the transponders 120) are treated as a "virtual" transponder 212, wherein each of the N transponder data streams is routed to a different one of the N transponders 120 for re-transmission. At the receiving stations 108, each of the N transponder data streams is downlinked from the satellites 118 via antenna 124 and receiver 126. In the receiver 126, each of the N transponder data streams is separately demodulated 300. After demodulation, the N transponder data streams are properly time-aligned and multiplexed at 302 to recover the single encoded data stream. The single encoded data stream is then FEC decoded at 304. The resulting single data stream is statistically demultiplexed at 306 to recover the M plurality of video and/or audio elementary streams 308. Each of the M video and/or audio elementary stream 308 are decoded by one of a plurality M of video and/or audio decoders 310 to complete the signal reception.

Spectrum Examples

There are a number of advantages to the present invention. One advantage is that the present invention allows efficient use of a fragmented signal spectrum, such as from non-contiguous guard bands. Consider the example shown in FIG. 4, which illustrates the insertion of guard band signals 400 between legacy band signals 402. In this example, the rate ratio between the legacy band 402 and the guard band 400 is approximately 4:1. To use these guard bands 400, the N transponder data streams described in FIGS. 2 and 3 are transmitted by the N transponders 120 in N guard bands. Alternatively, the N transponder data streams described in FIGS. 2 and 3 are transmitted by the N transponders 120 in a combination of N legacy bands and guard bands.

Another advantage is that the present invention allows narrow-band transponders 120 to simultaneously achieve high CNR and statistical-multiplexing efficiencies. Consider the example shown in FIG. 5, which illustrates the construction of high spectral-efficiency signals 500 in the legacy band 502. For high-throughput communication, spectral efficiency dictates a CNR that may be beyond current satellite TWTA power availability. For a given TWTA power, reducing the signal bandwidth can increase the CNR enough to meet the requirement. Multiple transponders 120, properly configured and spaced in the frequency domain in this way, can cover the entire signal bandwidth of interest. While each narrow-bandwidth signal might not support good statistical-multiplexing efficiency, the combined signal may do so with the present invention.

Yet another advantage is that the present invention reduces FEC code latency. The combined bandwidth provided by the present invention increases the effective symbol rate, thereby resulting in a shortened time duration of a given FEC.

Other Considerations

The communications system described herein is assumed to operate with a constant-envelope signal on all transponders 120. Typically, a single-carrier QPSK or 8PSK signal is used to maximize TWTA power efficiency. Either single-channel or multiple-channel receivers 126 may be used with the present invention.

Figure 4:
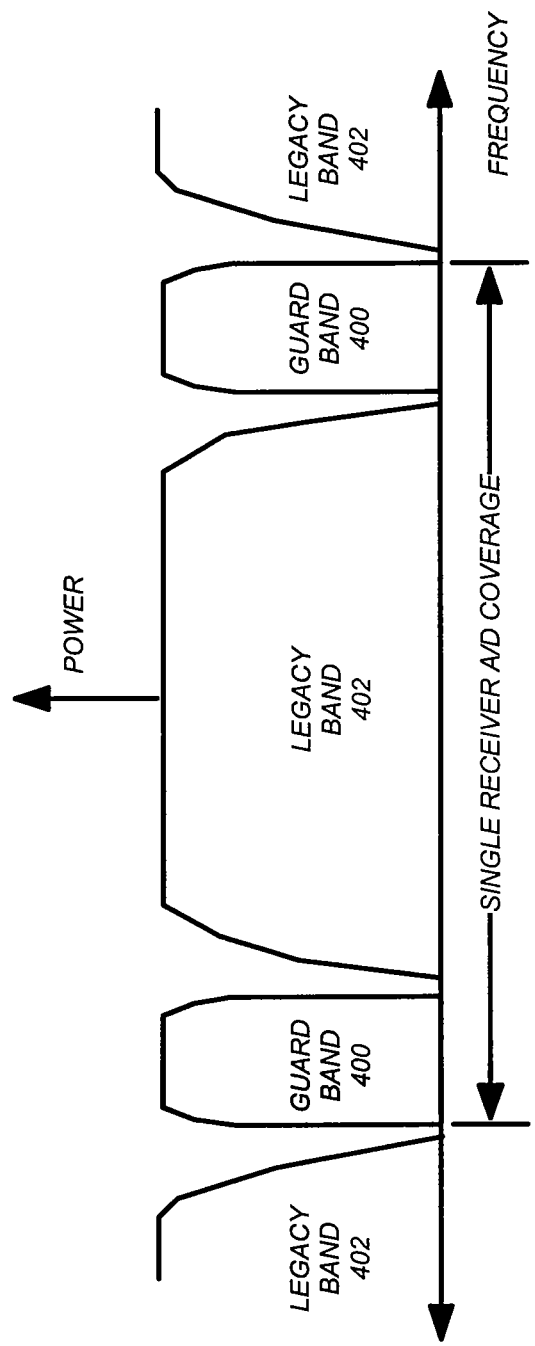
FIG. 4 illustrates the insertion of guard-band signals between legacy band signals according to the preferred embodiment of the present invention.

In a single-channel receiver 126 design, a single tuner with a fast, single-set, analog-to-digital (A/D) converter covers several transponder 120 signals that comprise a part or all of the virtual transponder 212. For example, if two guard bands 400 on either side of a legacy signal band 402 in FIG. 4 are to be combined, then the A/D converter of the receiver 126 must cover the bandwidth depicted in FIG. 4. After A/D conversion, digital filtering in the receiver 126 would be used to select the two guard bands 400, demodulating the signals to extract relevant information for further processing.

Alternatively, a multiple channel receiver 126 design may include a tuner and A/D converter for each physical transponder 120. Compared with a single-tuner receiver 126, the tuners and A/Ds in this embodiment are replicated in the receiver 126, but the A/Ds can be slower, as they only need to cover a narrow-band signal from one of the transponders 120.

Conclusion

In conclusion, the present invention allows efficient use of a signal spectrum, such as non-contiguous guard bands or a combination of legacy bands and guard bands, and allows narrow-band transponders to achieve high CNR and statistical-multiplexing efficiencies at the same time. In addition, the present invention works with any modulation or FEC schemes. Moreover, the present invention requires only a moderate increase in system and receiver complexity.

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method for transmitting a plurality of M concurrent elementary data streams from a first entity to a plurality of receivers via N narrow band physical transponders, each of the N narrow band physical transponders communicatively coupled to only one of a plurality of antennas, comprising the steps of:
generating, in the first entity, a single data stream from the M elementary data streams;
error correction encoding the single data stream comprising the M elementary data streams;
demultiplexing the single data stream into N transponder streams;
separately modulating and wirelessly transmitting each of the N transponder streams; and
receiving and wirelessly transmitting, in a second entity, the N transponder streams via a wide-band virtual transponder comprised of the N narrow band physical transponders, each of the N narrow band physical transponders directly transmitting an associated one of the N transponder streams to the plurality of receivers via the coupled antenna on a different portion of a signal spectrum than the other N narrow-band transponders;
wherein at least two of the different portions of the signal spectrum are non-contiguous in frequency.

2. The method of claim 1, wherein the step of generating the single data stream comprises the step of:
statistically multiplexing the M elementary data streams to produce the single data stream.

3. The method of claim 1, further comprising the steps of:
receiving the N transponder streams from the N transponders in one of the plurality of receivers; and
multiplexing the received N transponder streams to recover the single data stream.

4. The method of claim 1, wherein:
the method further comprises the step of demultiplexing the encoded single data stream into the N transponder streams; and
wherein the signal spectrum comprises a guard frequency band of a legacy signal spectrum.

5. The method of claim 1, further comprising the steps of:
receiving the N transponder streams from the N transponders in one of the plurality of receivers;
multiplexing the received N transponder streams to recover the encoded single data stream;
decoding the recovered encoded single data stream; and
demultiplexing the recovered data stream to recover at least one of the M elementary data streams.

6. The method of claim 1, wherein at least one of the N narrow band transponders has a bandwidth different than at least one of the other N narrow band transponders.

7. The method of claim 1, wherein the number of concurrent elementary data streams M is selected to match the throughput of the system.

8. The method of claim 1, wherein the single data stream is time demultiplexed into the N transponder streams.

9. An apparatus for transmitting a plurality of M concurrent elementary data streams from a first entity to a plurality of receivers via N narrow band physical transponders, each of the N narrow band physical transponders communicatively coupled to only one of a plurality of antennas, comprising:
a multiplexer, for generating, in a first entity, a single data stream from the M elementary streams;
an encoder for encoding the single data stream comprising the M elementary data streams;
a demultiplexer, for demultiplexing the single data stream into N transponder streams;
a transmitter, for separately modulating and wirelessly transmitting each of the N transponder streams; and
a wide-band virtual transponder, disposed in a second entity, for receiving and wirelessly transmitting the N transponder streams via a wide-band virtual transponder comprised of N narrow band physical transponders, each of the N narrow band physical transponders for directly transmitting an associated one of the N transponder streams to the plurality of receivers via the coupled antenna on a different portion of a signal spectrum than the other N narrow-band transponders; wherein at least two of the different portions of the signal spectrum are non-contiguous in frequency.

10. The apparatus of claim 9, wherein the multiplexer is a statistical multiplexer.

11. The apparatus of claim 9, wherein each of the plurality of receivers comprises:
 a tuner for receiving the N transponder streams from the N transponders; and
 a multiplexer for multiplexing the received N transponder streams to recover the single data stream.

12. The apparatus of claim 9, wherein:
 the apparatus further comprises a demultiplexer for demultiplexing the encoded single data stream into the N transponder streams; and
 wherein the signal spectrum comprises a legacy signal spectrum and wherein at least one of the different portions of the signal spectrum comprises a frequency guard band of the legacy signal spectrum.

13. The apparatus of claim 9, wherein each of the plurality of receivers further comprises:
 a tuner for receiving the N transponder streams from the N transponders;
 a multiplexer for multiplexing the received N transponder streams to recover the encoded single data stream;
 a decoder for decoding the recovered encoded single data stream; and
 a demultiplexer for demultiplexing the recovered data stream to recover at least one of the M elementary data streams.

14. The apparatus of claim 9, wherein at least one of the N narrow band transponders has a bandwidth different than at least one of the other N narrow band transponders.

15. The apparatus of claim 9, wherein the demultiplexer time demultiplexes the single data stream into the N transponder streams.

16. A method for receiving M concurrent elementary data streams, comprising:
 separately demodulating N transponder streams received from a wide band virtual transponder, wherein:
  the N transponder streams together comprise the M elementary data streams together error correction encoded as a single data stream that is demultiplexed into the N transponder streams and each of the N transponder streams are directly and wirelessly received from an associated one of N narrow-band transponders via a physical antenna communicatively coupled to only one of the N narrow-band transponders; and
  each of the N narrow band transponders transmits the associated transponder stream on a different portion of a signal spectrum than the other N narrow-band transponders;
 time-aligning the separately demodulated N transponder streams;
 multiplexing the separately demodulated N transponder streams to recover the error correction encoded single data stream comprising the M elementary data streams;
 error correction decoding the single data stream comprising the M elementary data streams to recover a decoded single data stream; and
 demultiplexing the decoded single data stream to recover the M elementary data streams;
 wherein the signal spectrum comprises a plurality of different portions, and at least two of the different portions of the signal spectrum are non-contiguous in frequency.

17. The method of claim 16, wherein the signal spectrum comprises a legacy signal spectrum and wherein at least one of the different portions of the signal spectrum comprises a guard band of the legacy signal spectrum.

18. The method of claim 16, wherein the M elementary data streams are statistically multiplexed.

19. The method of claim 16, wherein at least one of the N narrow band transponders has a bandwidth different than at least one of the other N narrow band transponders.

20. The method of claim 16, wherein the demultiplexer time demultiplexes the single data stream into the N transponder streams.

21. An apparatus for receiving a plurality of M concurrent elementary data streams, comprising:
 a tuner for separately demodulating N transponder streams received from a wide band virtual transponder, wherein:
  the N transponder streams together comprise the M elementary data streams together error correction encoded as a single data stream that is demultiplexed into the N transponder streams and each of the N transponder streams are wirelessly received from an associated one of N narrow-band physical transponders via a physical antenna communicatively coupled to only one of the N narrow-band transponders; and
  each of the N narrow band transponders transmits the associated transponder stream on a different portion of a signal spectrum than the other N narrow-band transponders;
 means for time-aligning the separately demodulated N transponder streams;
 a multiplexer for multiplexing the separately demodulated N transponder streams to recover the error correction encoded single data stream comprising the M elementary data streams;
 an error correction decoder for decoding the recovered error correction encoded single data stream comprising the M concurrent data streams to recover the single data stream; and
 a demultiplexer for demultiplexing the single data stream to recover the M elementary data streams;
 wherein the signal spectrum comprises a plurality of different portions, and at least two of the different portions of the signal spectrum are non-contiguous in frequency.

22. The apparatus of claim 21, wherein the signal spectrum comprises a legacy signal spectrum and wherein at least one of the different portions of the signal spectrum comprises a guard band of the legacy signal spectrum.

23. The apparatus of claim 21, wherein the M elementary data streams are statistically multiplexed, and the demultiplexer is a statistical demultiplexer.

24. The apparatus of claim 21, wherein at least one of the N narrow band transponders has a bandwidth different than at least one of the other N narrow band transponders.

25. The apparatus of claim 21, wherein the single data stream is time demultiplexed into the N transponder streams.

* * * * *